(12) United States Patent
Varmaraja et al.

(10) Patent No.: US 8,160,990 B2
(45) Date of Patent: Apr. 17, 2012

(54) PROCEDURAL CONSTRAINT ENGINE FOR PRODUCT CONFIGURATION

(75) Inventors: Muralidhara Varmaraja, Fremont, CA (US); Eugene Chikovani, Cupertino, CA (US); Ashfaq A. Jeelani, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 711 days.

(21) Appl. No.: 12/254,663

(22) Filed: Oct. 20, 2008

(65) Prior Publication Data

US 2009/0106181 A1 Apr. 23, 2009

Related U.S. Application Data

(60) Provisional application No. 60/981,439, filed on Oct. 19, 2007.

(51) Int. Cl.
 *G06F 17/00* (2006.01)
 *G06N 5/02* (2006.01)
(52) U.S. Cl. .................................................... 706/47
(58) Field of Classification Search .............. 706/47; 700/103, 97
 See application file for complete search history.

(56) References Cited

U.S. PATENT DOCUMENTS

2006/0052890 A1* 3/2006 Selway .......................... 700/97

OTHER PUBLICATIONS

AIAI, "Constraint Programming," http://www.aiai.ed.ac.uk/links/constr.html, Jun. 4, 1997, pp. 1-4.
Oracle®, "Siebel Product Administration Guide, Version 8.0," Dec. 2006, pp. 179-234.

* cited by examiner

*Primary Examiner* — Jeffrey A Gaffin
*Assistant Examiner* — Ola Olude-Afolabi
(74) *Attorney, Agent, or Firm* — Campbell Stephenson LLP

(57) ABSTRACT

Various systems and methods for integrating procedural logic with a stateless constraint engine are disclosed. One method involves accessing a first set of values generated by a stateless constraint engine based upon a first set of inputs and then accessing a second set of values generated by the stateless constraint engine subsequent to the first set of values and based upon a second set of inputs. The second set of values is validated based upon a procedural constraint. The procedural constraint can include a precondition and a postcondition. The precondition is dependent upon at least one value from the first set of values, and the postcondition is dependent upon at least one value from the second set of values.

19 Claims, 6 Drawing Sheets

PROCEDURAL CONSTRAINT ENGINE FOR PRODUCT CONFIGURATION

RELATED APPLICATIONS

This application claims the benefit under 35 U.S.C. § 119 (e) of U.S. Provisional Application No. 60/981,439, filed Oct. 19, 2007, entitled "Procedural Constraint Engine," and naming Muralidhara Varmaraja, Eugene Chikovani, and Ashfaq A. Jeelani as inventors. The above-referenced application is hereby incorporated by reference herein in its entirety as if completely and fully set forth herein.

FIELD OF THE INVENTION

This invention relates to constraint engines and, more particularly, to combining procedural logic with stateless constraint engines.

BACKGROUND

A constraint engine is a software module that is programmed using a set of constraints. Each constraint is a rule to be enforced by the constraint engine. Rules are specified as true/false conditions. The constraint engine is configured to generate a solution that satisfies all of the rules, such that each of the specified true/false conditions evaluates to true. Thus, a constraint engine can be configured to apply a set of rules, each of which specifies a condition that can depend upon one or more variables and that can evaluate to either true or false. The constraint engine is configured to generate a solution (e.g., a set of variable values) that causes all of the rules to evaluate to true.

In addition to being configured with prespecified rules, the constraint engine can receive requests as dynamic inputs. These requests can include values of one or more of the variables upon which the true/false conditions depend. Based on the rules and requests, the constraint engine identifies a solution that satisfies all of the rules.

Typically, off-the-shelf constraint engines are stateless. Accordingly, the solution generated by evaluating those rules will not depend upon any previously-generated solution. Furthermore, constraint engines typically operate in a non-cascading manner, such that a constraint engine will evaluate all of its rules at once. These aspects of off-the-shelf constraint engines may limit their usefulness in certain applications. For example, it is desirable to be able to use a constraint engine to generate the appropriate options to display to user when the user is configuring a product. Often, it is desirable to display these options in stages. For example, the user can select a configuration of one component in one stage and another component in another stage. If the constraint engine generates a solution in a later stage of configuration that changes a variable value that was already selected in a prior stage of configuration, it can result in a frustrating user experience, since a seemingly valid prior choice is now being invalidated.

While off-the-shelf constraint engines may have difficulties providing satisfactory solutions in certain environments, creating a custom constraint engine is extraordinarily expensive, in terms of both time and resources. Accordingly, it is desirable to be able to adapt an off-the-shelf constraint engine for use in such environments.

BRIEF DESCRIPTION OF THE DRAWINGS

A more complete understanding of the present invention may be acquired by referring to the following description and the accompanying drawings, in which like reference numbers indicate like features.

Figure 1:
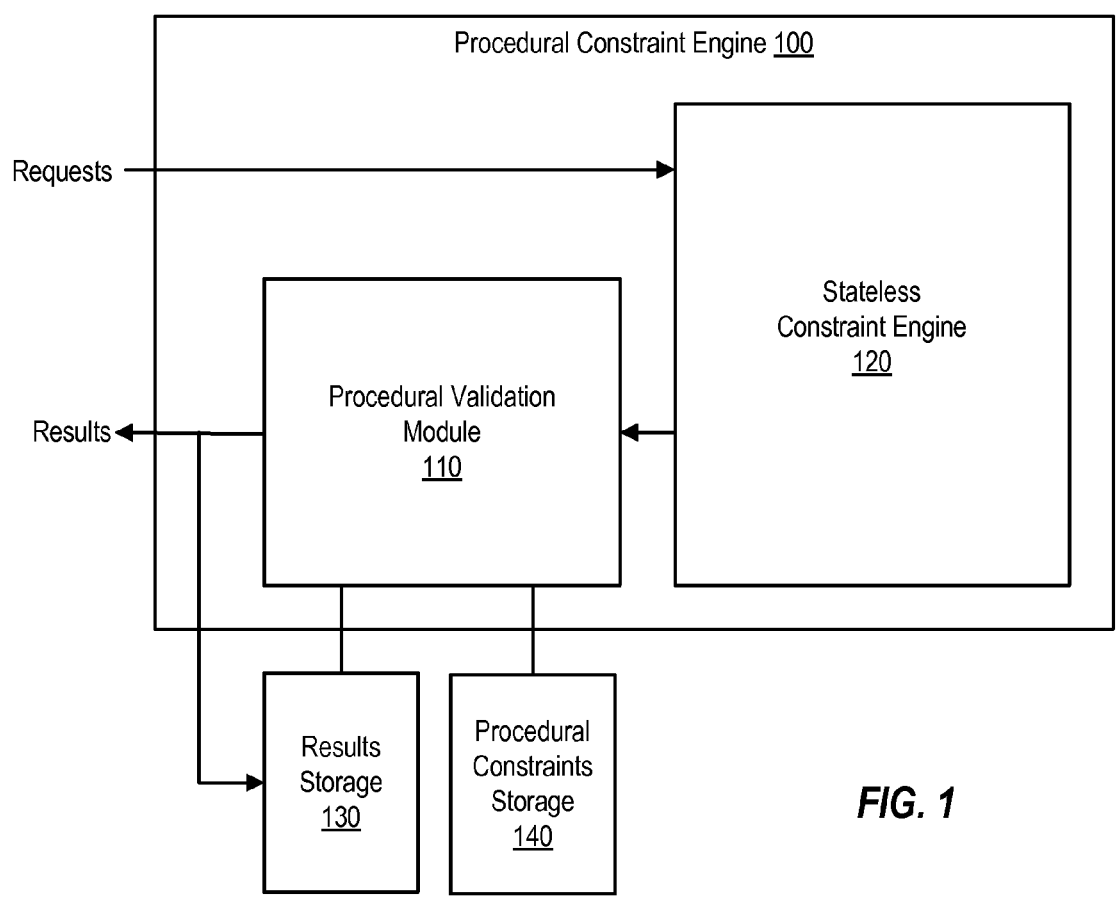
FIG. 1 is a block diagram of a procedural constraint engine, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a procedural constraint engine. The procedural constraint engine 100 includes a procedural validation module 110 and a stateless constraint engine 120. Procedural validation module 110 is configured to store results generated by stateless constraint engine 120 in results storage 130 and to access previously-stored results from results storage 130.

Stateless constraint engine 120 is an off-the-shelf constraint engine, such as ILOG CP, available from ILOG, Inc. of Sunnyvale, Calif. Stateless constraint engine 120 is configured with a set of rules. Each rule specifies a constraint in the form of a condition that can evaluate to either true or false. For example, a rule can specify that X+Y>0. These conditions can depend upon one or more variables, such as X and Y in the above example.

The rules used to implement stateless constraint engine 120 can vary depending upon the environment in which stateless constraint engine 120 is being used. For example, if stateless constraint engine 120 is being used to control product configuration, the rules can specify acceptable configurations of a product. If two components of the product are incompatible with each other and thus cannot both be included in the same product configuration, the rules can specify that both subcomponents cannot simultaneously be present within the same product configuration.

During operation, one or more requests (e.g., in the form of current values of one or more variables) can be input to procedural constraint engine 100 from an application that needs the constraint engine to generate an appropriate set of results, given the current requests. In response to these requests, stateless constraint engine 120 evaluates the requests against its rules and generates a solution that includes several values (the values within the solution are referred to herein as results). The results generated by stateless constraint engine 120 can be returned to the requesting application, if the results are successfully validated by procedural validation module 110.

Procedural validation module 110 is configured to receive information (e.g., from an administrator, via a user interface, command line interface, or the like) specifying one or more procedural constraints on the results generated by stateless constraint engine 120. These procedural constraints can be stored in procedural constraints storage 140 (e.g., on a hard drive, in memory, or the like) for later retrieval.

Each procedural constraint indicates a limitation to be imposed upon on a new set of results, and each limitation is based upon a prior set of results. In one embodiment, each procedural constraint can be specified as a pair of conditions that includes a precondition and a postcondition. If the precondition is true, the results generated by stateless constraint engine 120 must be such that the associated postcondition is also true. If the precondition is false, the associated postcondition will not be used to validate the results generated by stateless constraint engine 120.

Thus, each procedural constraint can include a precondition and a postcondition. In response to receiving information specifying a procedural constraint, procedural validation module 110 can store that information and begin using the procedural constraints to validate results generated by stateless constraint engine 120.

Procedural validation module 110 is configured to evaluate each precondition based upon a set of results that was previously determined to be valid. For example, at time T1, an initial set of requests can be provided to procedural constraint engine 100, causing stateless constraint engine 120 to generate a set of results based upon those requests.

At T1, no previous results have been generated by stateless constraint engine. Since there are no previous results to use to evaluate the preconditions, procedural validation module 110 will determine that all preconditions are false. Accordingly, none of the postconditions will be used to validate the initial set of results generated by stateless constraint engine 120 at time T1.

Since no procedural constraints are being applied in this situation, the results generated by stateless constraint engine 120 at T1 will be validated. The valid results will be returned to the requesting application and stored in results storage 130.

At time T2, a second set of requests can be provided to stateless constraint engine 120, causing stateless constraint engine to generate a second set of results. Procedural validation module 110 can validate the second set of results based upon the procedural constraints. Procedural validation module 110 will first evaluate the preconditions in the procedural constraints, based upon the first set of results, which were generated at T1 and stored in results storage 130. For example, if one of the preconditions is X>0, and if the first set of results specify that X=1, the precondition X>0 will evaluate to true.

After all of the preconditions have been evaluated, procedural validation module 110 will then evaluate, based on the second set of results generated by stateless constraint engine, each postcondition that is associated with a precondition that is currently true. For example, the postcondition Y<X can be associated with the precondition X>0, such that if X>0, then Y<X. To evaluate the postcondition, procedural validation module 110 obtains the values of X and Y specified in the second set of results and uses these values to evaluate the postcondition.

If the postcondition evaluates to true, procedural validation module 110 will determine that the second set of results satisfies the procedural constraint that includes that postcondition; if all postconditions associated with true preconditions evaluate to true, procedural validation module 110 will determine that the second set of results is valid. In response to determining that the second set of results is valid, procedural validation module 110 will allow the second set of results to be returned to the requester. Procedural validation module 110 can also store the second set of results in results storage 130. The second set of results can then be used to reevaluate each of the preconditions, for use in validating the next set of results.

If any of the postconditions that are associated with currently true preconditions evaluate to false, procedural validation module 110 will generate an error condition. Instead of returning the second set of results to the requester, procedural validation module 110 will return information identifying the error condition. This information can include information identifying which of the procedural constraints were not satisfied by the results. Procedural validation module 110 can store the second set of results (preferably with an indication that the second set of results is invalid); however, since the second set of results are invalid, the second set of results will not be used to evaluate the preconditions for use in validating the next set of results generated by stateless constraint engine 120. Instead, the most recently generated set of valid results (here, the set of results generated at T1) will be used to evaluate the preconditions when evaluating the next set of results.

In some situations, it may be desirable to configure stateless constraint engine with certain rules that are weak rules. A weak rule is a rule that the stateless constraint engine is not required to satisfy. In one embodiment, a weak rule can be specified as a constraint in the same manner as a normal, non-weak rule, with the additional condition that "the constraint is true." This allows the stateless constraint engine to attempt to satisfy the constraint, but if the constraint cannot be satisfied, the stateless constraint engine will simply rely upon the additional condition to make the weak rule evaluate to true.

In some embodiments, the application that sent the requests to procedural constraint engine 100 is configured to regenerate the requests in response to receiving an error indication from procedural constraint engine 100. For example, if the error indication indicates that a particular postcondition was not satisfied, the requesting application can attempt to generate a new set of requests that will cause the postcondition to be satisfied. For example, the requesting application can change one or more requests to have a different value in an attempt to effectively enable or disable a constraint within stateless constraint engine 120 (such attempts can be particularly successful if the constraint to be disabled is a weak constraint, as described above). Similarly, the application may be able to specify a particular control for stateless constraint engine 120. For example, when the application resubmits the requests, the application can specify that stateless constraint engine should start with minimal (e.g., as opposed to maximal) values when generating a set of results.

Figure 2A:
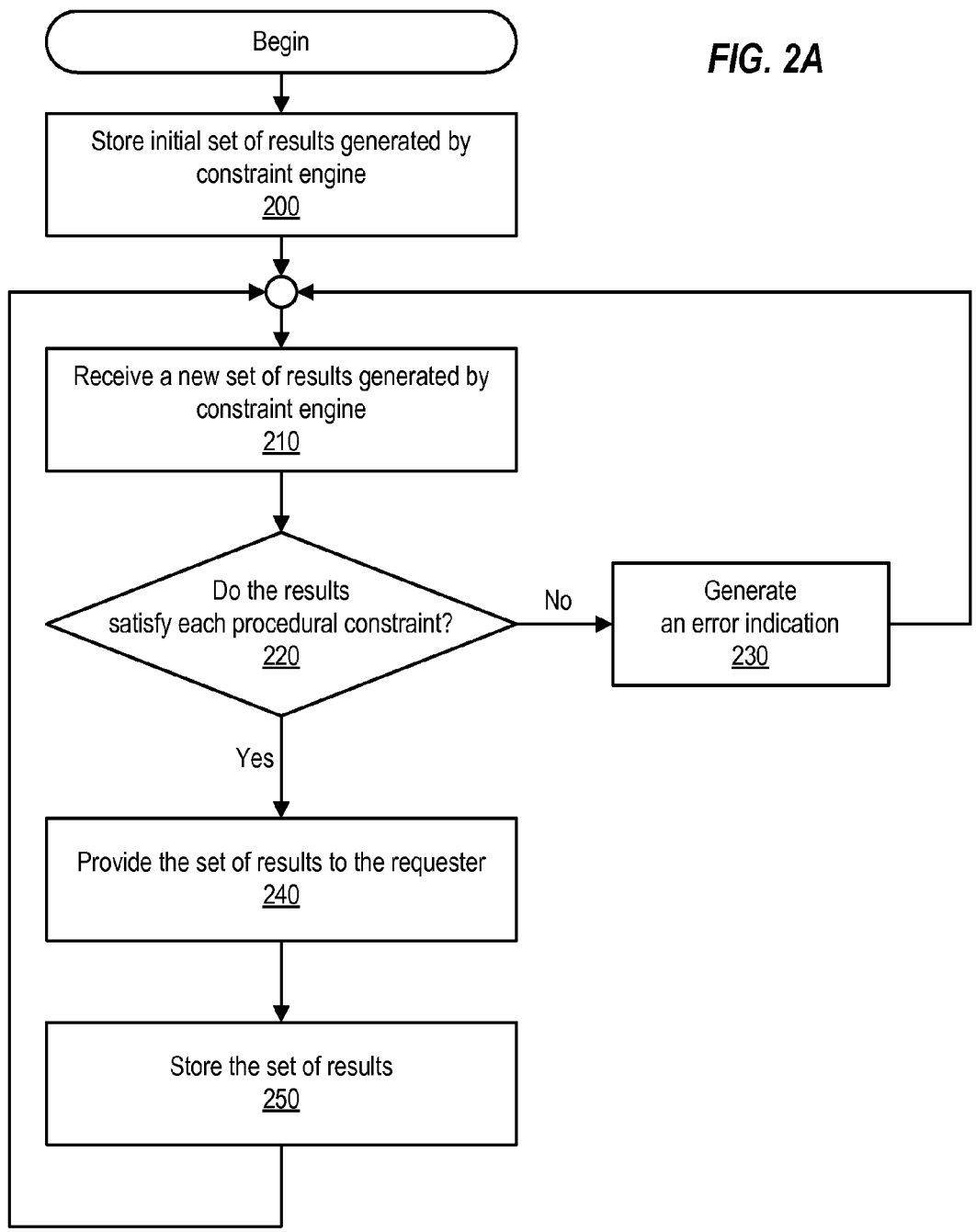
FIG. 2A is a flowchart of a method of using procedural logic to validate the output of a stateless constraint engine, according to one embodiment of the present invention.

FIG. 2A is a flowchart of a method of using procedural logic to validate the output of a stateless constraint engine. Prior to performance of this method, a procedural constraint engine can be initialized (e.g., by entering rules to be evaluated by a stateless constraint engine and a set of one or more procedural constraints to be evaluated by a procedural validation module). The initialized procedural constraint engine can then wait for a first set of requests to be received from a requester. In response to receiving the first set of requests, the initialized procedural constraint engine will attempt to obtain a solution (i.e., a set of results that satisfy all constraints). If no solution can be obtained, the stateless constraint engine will signal an error condition; otherwise, the stateless constraint engine will output the solution. In this example, it is assumed that the stateless constraint engine is always able to generate a solution.

The method begins at 200, when the initial set of results generated by the stateless constraint engine is stored. This initial set of results will always be valid, since there are no prior results to use to evaluate the procedural constraints.

At 210, a new set of results generated by the stateless constraint engine is received. These results are validated against the procedural constraints, as shown at 220. The procedural constraints specify constraints that depend upon both a prior set of results generated by the stateless constraint engine and the current set of results generated by the stateless constraint engine. More details of how this validation can be performed using procedural constraints that include preconditions and postconditions are provided with respect to FIG. 2B.

Performing operation 220 involves accessing the new set of results received at 210, accessing the most recently received set of valid results, if any, that was received prior to the new set of results, and accessing the information identifying the procedural constraints to be applied to the new set of results. The first time operation 220 is performed, the initial set of results received at 200 are the previous set of valid results. When operation 220 is subsequently performed, the previous set of valid results will be the most recently stored set of valid results, prior to reception of the new set of results to be validated.

If the new results fail to satisfy any of the procedural constraints, as determined based upon the prior set of valid results, the new results received at 210 are determined to be invalid and an error indication is generated, as indicated at 230. This error indication, along with information identifying which of the procedural constraints were not satisfied, can be returned to the requesting application instead of the invalid set of results.

If instead all of the procedural constraints are satisfied, the set of results received at 210 is determined to be valid and is provided to the requester, as shown at 240. The valid results can also be stored, as shown at 250. The next time a set of results is received (e.g., when operation 210 is repeated), these stored results can be used to evaluate the procedural constraints.

Figure 2B:
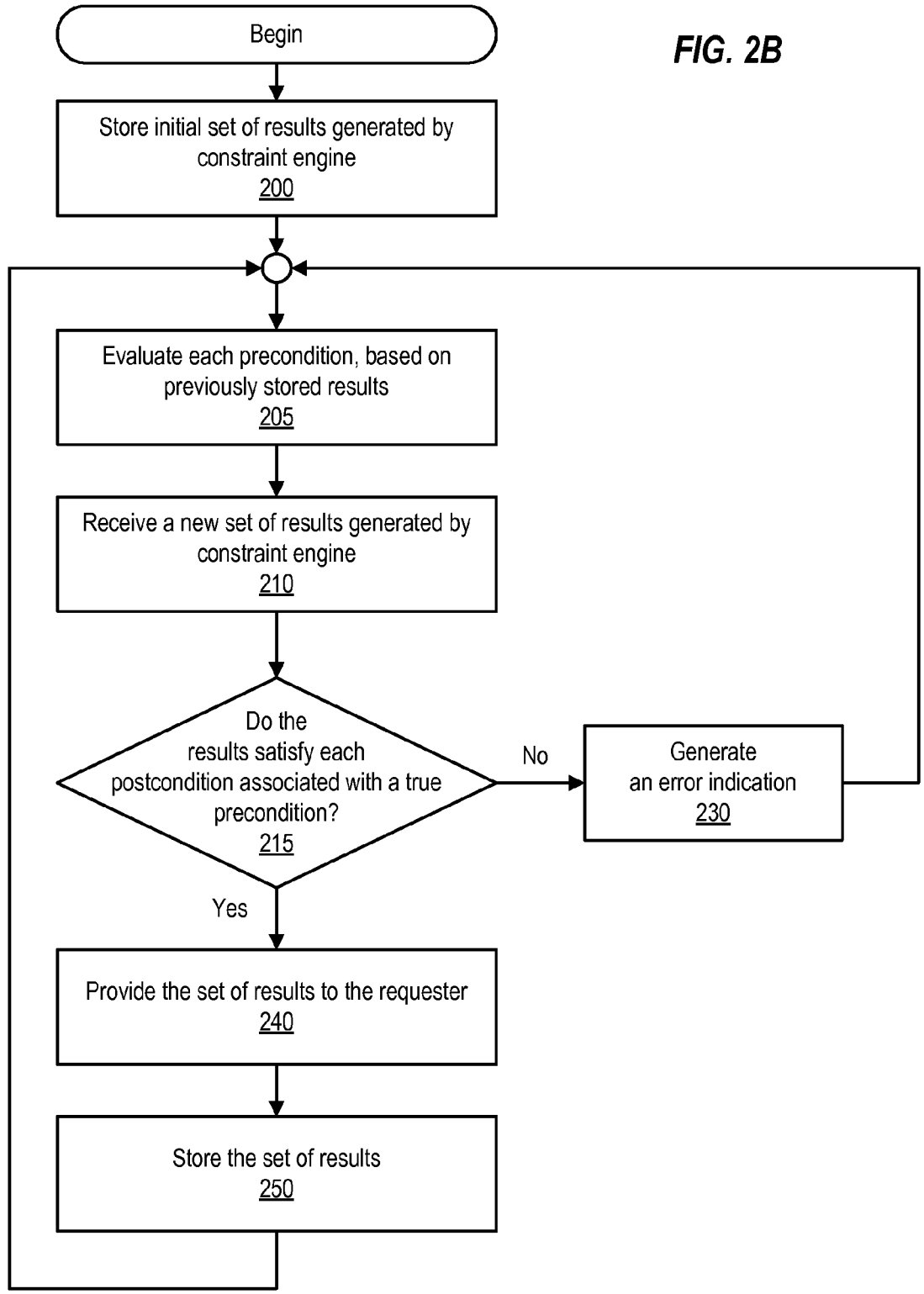
FIG. 2B is a flowchart of a method of using preconditions and postconditions to validate the output of a stateless constraint engine, according to one embodiment of the present invention.

FIG. 2B is a flowchart of a similar method of using procedural logic to validate the output of a stateless constraint engine. In this example, the procedural constraints are specified using preconditions and postconditions. This flowchart includes several of the same operations as FIG. 2A.

Like the method of FIG. 2A, the method of FIG. 2B begins at 200, when the initial set of results generated by the stateless constraint engine is stored. As noted above, this initial set of results will always be valid, since there are no prior results to use in evaluating the procedural constraints.

At 205, each precondition included in the procedural constraints is evaluated, based upon the most recently stored set of valid results. The first time operation 205 is performed, the initial set of results stored at 200 will be used to evaluate each of the preconditions. The outcome of this evaluation can be stored, at least temporarily.

At 210, a new set of results generated by the stateless constraint engine is received. These results are then validated against each postcondition in the procedural constraints that is associated with a precondition that evaluated to true at 205. In other words, if a given precondition is true, the associated postcondition will be evaluated, based upon the new set of results received at 210. If the postcondition is also true, the results are determined to satisfy the procedural constraint that includes the precondition and the postcondition.

If any of the postconditions associated with true preconditions do not evaluate to true, the results received at 210 are determined to be invalid and an error indication is generated, as indicated at 230. This error indication, along with information identifying which of the procedural constraints were not satisfied, can be returned to the requesting application instead of the invalid set of results.

If all of the procedural constraints are satisfied, the set of results received at 210 is determined to be valid and are provided to the requester, as shown at 240. The valid results can also be stored, as shown at 250. These stored results can be used to evaluate the preconditions included in the procedural constraints at 205.

It is noted that the operations of FIGS. 2A and 2B can be performed in a different order than is shown herein. For example, operation 205 can be performed at the same time as or subsequent to operation 210 in alternative embodiments. Similarly, in alternative embodiments, different operations can be performed instead of and/or in addition to the operations described above.

Figure 3:
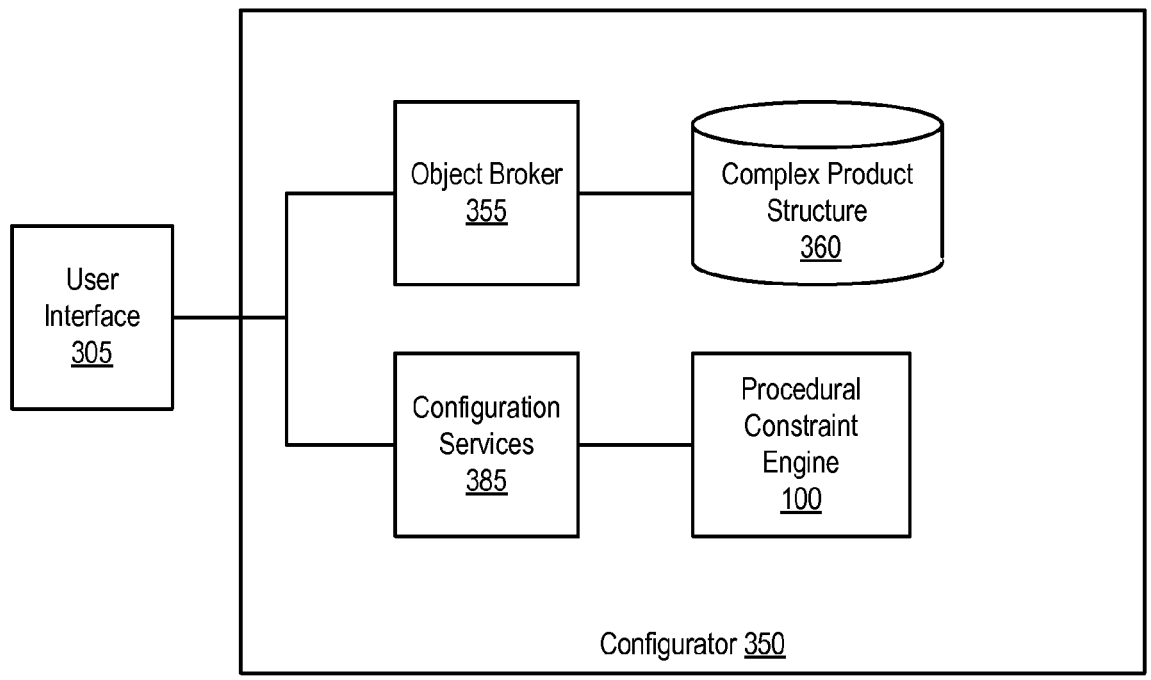
FIG. 3 is a block diagram of an order management system that includes a configurator that uses a procedural constraint engine, according to one embodiment of the present invention.

FIG. 3 is a block diagram of an order management system that includes a configurator that uses a procedural constraint engine to support user configuration of a product. As shown, the order management system includes a user interface 305 and a configurator 350. The configurator provides information (e.g., such as current options, requirements, pricing, and the like) needed to allow a user to be able to configure a product via user interface 305.

Configurator 350 includes object broker 355, which is configured to access product definitions such as complex product structure 360. These product definitions specify the various ways in which one or more complex product or product bundle can be configured (e.g., in terms of options and the like). For example, the product definitions can identify each subcomponent of a given component, indicate how many of each type of such subcomponents can be included within the component, indicate whether certain subcomponents are incompatible with other subcomponents, indicate whether any subcomponents must be included (e.g., if another subcomponent is included, or that one subcomponent of a certain type must be included), and the like. Object broker 355 can provide information representing these product definitions to other modules within configurator 350. For example, if a user is initiating a process to configure a particular product via user interface 305, object broker 355 can obtain the appropriate product definition(s) for that particular product from complex product structure 360 and provide the definition(s) to configuration services 385.

Configuration services 385 translate a product definition obtained by object broker 355 into one or more rules and/or procedural constraints. Configuration services 385 can then initialize procedural constraint engine 100 with the rules and procedural constraints. In one embodiment, the procedural constraints correspond to a desired user experience and/or configuration sequence associated with the product to be configured. For example, the desired user experience can specify that certain options should be displayed to the user at certain points in the user experience. Similarly, the configuration sequence can be such that various subsystems are configured in a particular sequence. A selection made when configuring one subsystem may control allowable selections when subsequently configuring another subsystem.

The rules used to initialize procedural constraint engine 100 can be based upon configuration constraints specified in the product definition. A configuration constraint defines how two items in a customizable product or a product with attributes are related. For example, a product may have two components, Component A and Component B, that are mutually exclusive. If the user picks one of these components, then the user cannot pick the other component. A configuration constraint to enforce this condition can be: Component A excludes Component B. Similarly, a product with attributes may be available in a number of different colors and sizes. However, the color red may not be available in the XL size. One way to prevent users from picking a product with the color red and the XL size is to write a configuration constraint: Red excludes XL. Thus, configuration services 385 can use these configuration constraints to create rules for use in initializing procedural constraint engine 100.

The product definition can also include conditional information that configuration services 385 can use to create procedural constraints for use in initializing procedural constraint engine 100. For example, the product definition can indicate "when [condition A is true] [enforce constraint B], otherwise [enforce constraint C]." Based upon this information, configuration services 385 can create two procedural constraints. The first procedural constraint has a precondition of "condition A=true" and a postcondition "constraint B." The second procedural constraint has a precondition of "condition A=false" and a postcondition "constraint C."

As another example of how configuration services 385 can operate, consider the following scenario. Customizable product A has a relationship RI with products B1 and B2. Product A has attribute C with enumerated values C1 and C2. The option C2 is valid only with product B2. The desired user experience should display the C2 option to the user, along with the B1 product choice, and then display an appropriate message if both B1 and C2 are chosen. To enforce this desired user experience (e.g., as identified in complex product structure 360), configuration services 385 can generate the following procedural constraint: if condition NOT (selection of [B2]) is true, then enforce resultant condition NOT (the attribute C=C2), where NOT indicates the inverse or opposite of the modified condition (e.g., if B2 is selected, NOT (selection of [B2]) will evaluate to false).

Once configuration services 385 have generated the appropriate rules and procedural constraints for a particular product or product bundle (e.g., a set of multiple products) defined in complex product structure 360, procedural constraint engine 100 is initialized with these rules and procedural constraints. In some embodiments, initializing procedural constraint engine 100 can involve recompiling a stateless constraint engine in order to incorporate the rules generated by configuration services 385.

After procedural constraint engine 100 has been initialized for a particular product or product bundle, a user can begin configuring that product or product bundle. Procedural constraint engine 100 can generate a set of results identifying allowable configuration options for each step in the configuration process. Information identifying the allowable configuration options can then be displayed to the user via user interface 305. If there are multiple configuration steps, procedural constraint engine 100 can be invoked at each step. Procedural constraints based upon results generated for a prior configuration step can also be enforced by procedural constraint engine 100.

Figure 4:
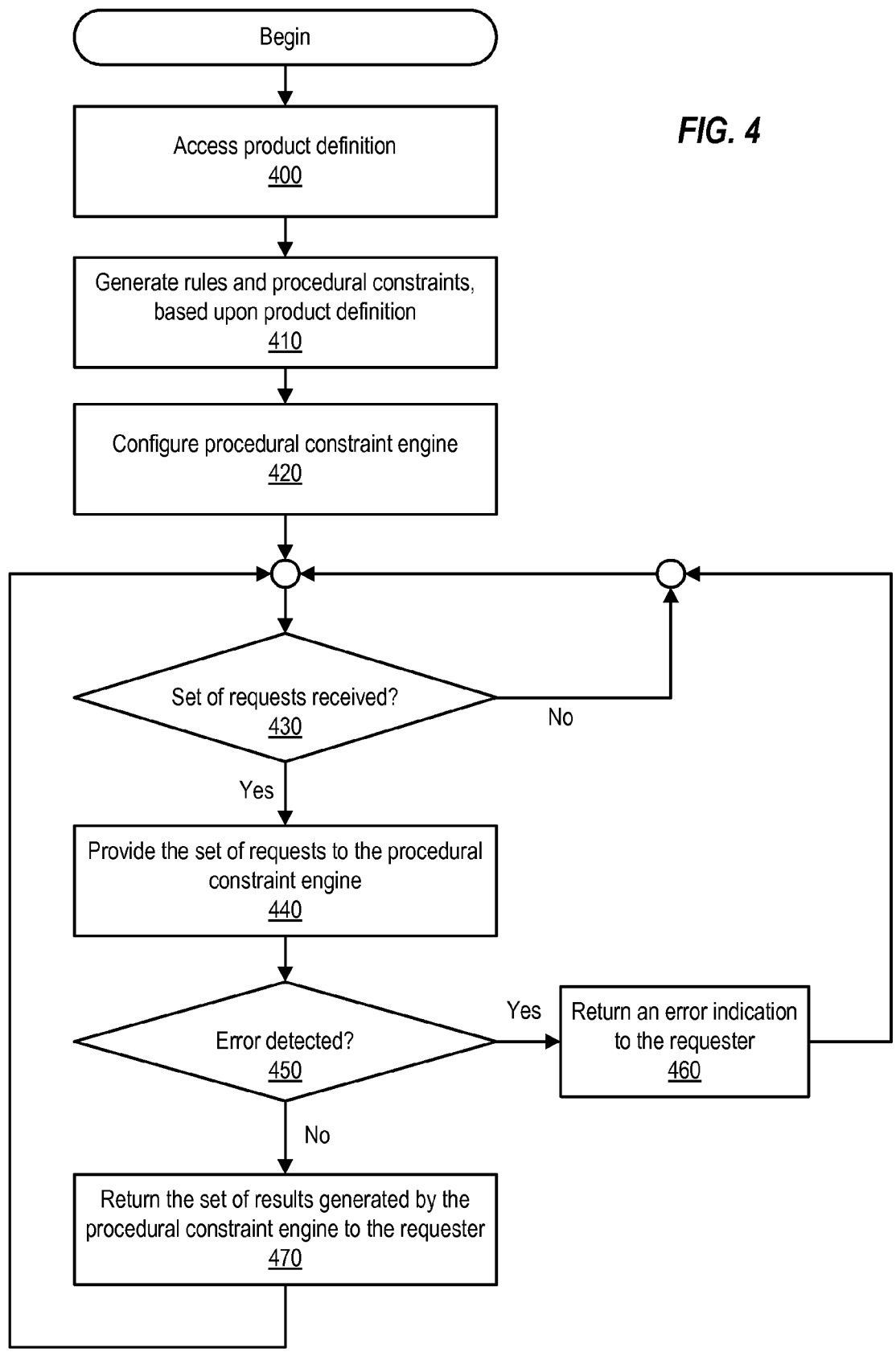
FIG. 4 is a flowchart of a method of using a procedural constraint engine in product configuration, according to one embodiment of the present invention.

FIG. 4 is a flowchart of a method of using a procedural constraint engine to perform product configuration. This method can be performed by a configurator like the one shown in FIG. 3.

The method begins at 400, when a product definition is accessed. The product definition can be accessed in response to receiving information indicating that a user wishes to begin configuring a particular product or product bundle. If multiple product definitions correspond to the product or product bundle to be configured, operation 400 can be repeated for each corresponding product definition. The product definition indicates how a product can be configured by identifying components of the product, technical constraints on which subsets of components can or must be included, information indicating a desired user experience or configuration sequence, and the like.

A set of rules and procedural constraints can then be generated, as shown at 410, based upon the accessed product definition. The rules are a set of true/false conditions. The rules are generated such that the constraints identified in the product definition will be satisfied if all of the rules evaluate to true.

The procedural constraints constrain the results generated by evaluating the rules in order to further comply with the product definition, based upon a previously generated set of results. In one embodiment, each procedural constraint includes a precondition and a postcondition, as described above. In alternative embodiments, a procedural constraint can include multiple postconditions per precondition. For example, a procedural constraint can include multiple postconditions that must be satisfied if the corresponding precondition evaluates to true. As another example, a procedural constraint can include a postcondition that must be satisfied if the associated precondition is true and another postcondition that must be satisfied if the associated precondition is false.

After the rules and procedural constraints have been generated for each product definition associated with the product or product bundle to be configured, a procedural constraint engine is configured to implement the rules and procedural constraints, as shown at 420. Performing operation 420 can involve compiling a stateless constraint engine to include the generated rules, and then storing the procedural constraints for later access by a procedural validation module.

At 430, a set of requests is received. These requests can include variable values that correspond to a user selection made during the configuration process. The received set of requests is then input to the procedural constraint engine 440. In response, the procedural constraint engine attempts to generate a set of results that satisfy both the rules and the procedural constraints. If the procedural constraint engine generates such a set of results, the set of results is returned to the requester, as indicated at 470. These results can indicate configuration options and messages to be displayed to the user during the next step of the configuration process.

If instead the procedural constraint engine is unable to generate a set of results that satisfy both the rules and the procedural constraints, an error will be detected, as shown at 450, and an error indication will be returned to the requester, as shown at 460. In this situation, the requester may attempt to modify and resubmit the request. Alternatively, the requester may simply signal an error the user and/or end the configuration process.

Figure 5:
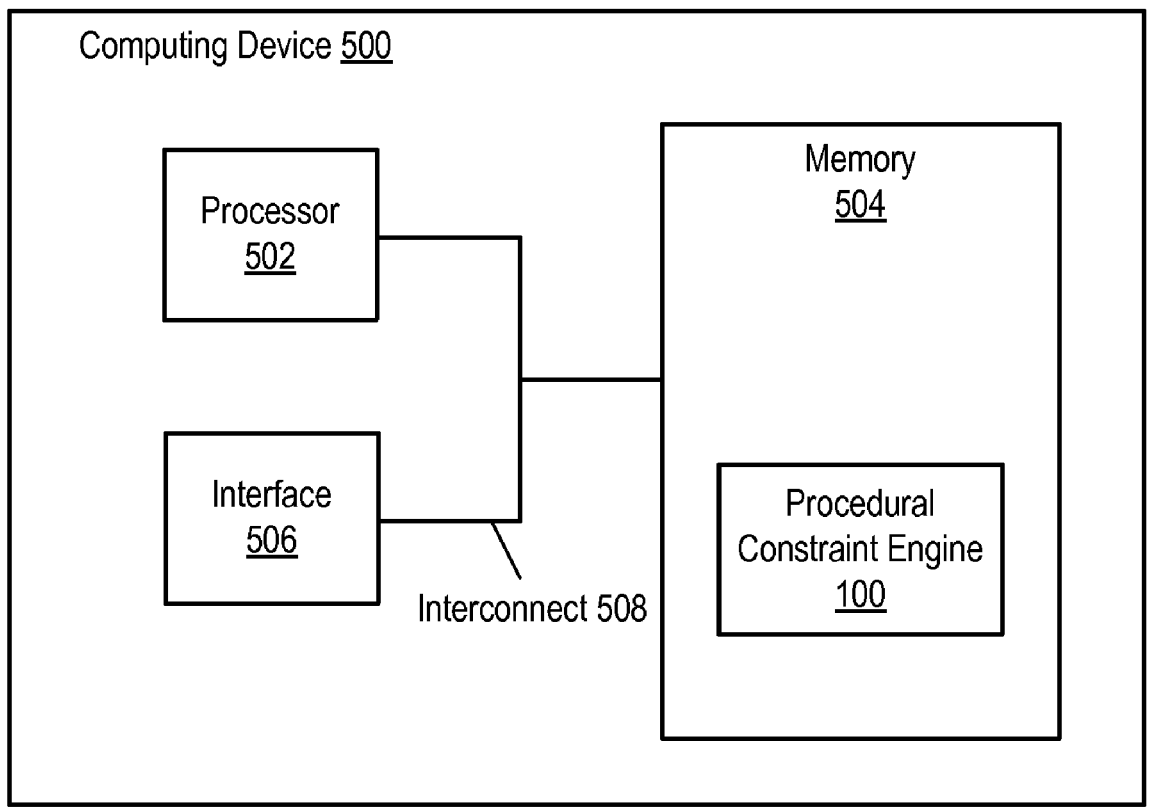
FIG. 5 is a block diagram of a computer system that illustrates how a procedural constraint engine can be implemented in software, according to one embodiment of the present invention.

FIG. 5 is a block diagram of a computer system that illustrates how a procedural constraint engine can be implemented in software. FIG. 5 shows a computing device 500 that implements a procedural constraint engine 100. Computing device 500 can be a personal computer, network appliance, server, personal digital assistant, mobile phone, storage controller (e.g., an array controller, tape drive controller, or hard drive controller), or the like. As illustrated, computing device 500 includes one or more processors 502 (e.g., microprocessors, Programmable Logic Devices (PLDs), or Application Specific Integrated Circuits (ASICs)) configured to execute program instructions, which can implement all or part of procedural constraint engine 100, stored in memory 504. Memory 504 can include various types of RAM (Random Access Memory), Read Only Memory (ROM), Flash memory, Micro Electro-Mechanical Systems (MEMS) memory, magnetic core memory, and the like. Memory 504 can include both volatile and non-volatile memory. Computing device 500 also includes one or more interfaces 506. Processor 502, interface 506, and memory 504 are coupled to send and receive data and control signals by a bus or other interconnect.

Interface 506 can include a network interface to various networks and/or interfaces to various interconnects and/or peripherals. For example, interface 506 can include a network interface via which requests to access the procedural constraint engine are received from other devices and/or applications. Interface 506 can also include an interface to one or more storage devices. For example, procedural constraint engine 100 can store results to a storage device via interface 506. Similarly, procedural constraint engine 100 can access stored information (e.g., such as information specifying rules, pre- and/or post-conditions, inputs to the constraint engine, previous results generated by the constraint engine, and the like) via interface 506. If interface 506 includes an interface to a monitor or other display device, results and/or error conditions generated by procedural constraint engine 100 can be displayed on the display device.

In this example, program instructions and data executable to implement all or part of procedural constraint engine 100 are stored in memory 504. The program instructions and data implementing procedural constraint engine 100 can be stored on various computer readable storage media such as memory 504. In some embodiments, such software is stored on a computer readable medium such as a Compact Disc (CD), Digital Versatile Disc (DVD), hard disk, optical disk, tape device, floppy disk, and the like). In order to be executed by processor 502, the instructions and data can be loaded into memory 504 from the other computer readable storage medium. The instructions and/or data can also be transferred to computing device 500 for storage in memory 504 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   accessing a first set of values generated by a stateless constraint engine,
      wherein the first set of values are generated based upon
         a first set of inputs to the stateless constraint engine, wherein the first set of inputs indicates a first set of user selections during a product configuration, and
         a set of one or more rules applied by the stateless constraint engine;
   accessing a second set of values generated by the stateless constraint engine, wherein
      the second set of values are generated subsequent to generation of the first set of values,
      the second set of values are generated based upon a second set of inputs to the stateless constraint engine, the second set of inputs indicates a second set of user selections during the product configuration, and
      the second set of user selections is made subsequent to the first set of user selections and subsequent to generation of the first set of values; and
   validating the second set of values based upon a precondition and a postcondition, wherein
      the validating is performed by at least one processor,
      the precondition is dependent upon at least one value from the first set of values, and
      the postcondition is dependent upon at least one value from the second set of values.

2. The method of claim 1, further comprising: generating an error indication, if the postcondition is false.

3. The method of claim 1, further comprising:
   evaluating a plurality of preconditions, based upon the first set of values; and
   identifying a subset of a plurality of postconditions, wherein each postcondition in the subset is associated with one of the plurality of preconditions that evaluated to true, and wherein said validating the second set of values comprises validating the second set of values based upon each postcondition in the subset of postconditions.

4. The method of claim 1, further comprising:
   receiving a third set of values generated by the stateless constraint engine, wherein the third set of values are received subsequent to receipt of the second set of values, and wherein the third set of values are generated based upon a third set of inputs to the stateless constraint engine; and
   validating the third set of values based upon a new value of the precondition and a new value of the postcondition, wherein the new value of the precondition is dependent upon at least one value from the second set of values and wherein the new value of the postcondition is dependent upon at least one value from the third set of values.

5. The method of claim 1, wherein the first set of values indicates a first version of the product configuration, wherein the second set of values indicates a second version of the product configuration, and wherein both the first version and the second version comply with the rules applied by the stateless constraint engine.

6. The method of claim 1, wherein the precondition and the postcondition are associated with a configuration sequence.

7. The method of claim 1, wherein the precondition and the postcondition are associated with a prespecified user experience.

8. The method of claim 1, wherein the stateless constraint engine is configured to enforce a plurality of constraints, and wherein at least one of the constraints is a weak constraint.

9. The method of claim 1, further comprising: using the second set of values to reevaluate the precondition, if the postcondition is true.

10. A non-transient computer readable storage medium storing program instructions executable to:
   access a first set of values generated by a stateless constraint engine,
      wherein the first set of values are generated based upon
         a first set of inputs to the stateless constraint engine, wherein the first set of inputs indicates a first set of user selections during a product configuration, and
         a set of one or more rules applied by the stateless constraint engine;
   access a second set of values generated by the stateless constraint engine, wherein
      the second set of values are generated subsequent to generation of the first set of values, the second set of values are generated based upon a second set of inputs to the stateless constraint engine, the second set of inputs indicates a second set of user selections during the product configuration, and the second set of user selections is made subsequent to the first set of user selections and subsequent to generation of the first set of values; and validate the second set of values based upon a precondition and a postcondition, wherein the precondition is dependent upon at least one value from the first set of values, and the postcondition is dependent upon at least one value from the second set of values.

11. The computer readable storage medium of claim 10, wherein the program instructions are further executable to generate: an error indication, if the postcondition is false.

12. The computer readable storage medium of claim 10, wherein the program instructions are further executable to:

evaluate a plurality of preconditions, based upon the first set of values; and identify a subset of a plurality of postconditions, wherein each postcondition in the subset is associated with one of the plurality of preconditions that evaluated to true, and wherein validating the second set of values comprises validating the second set of values based upon each postcondition in the subset of postconditions.

13. The computer readable storage medium of claim 10, wherein the program instructions are further executable to:

access a third set of values generated by the stateless constraint engine, wherein the third set of values are received subsequent to receipt of the second set of values, and wherein the third set of values are generated based upon a third set of inputs to the stateless constraint engine; and validate the third set of values based upon a new value of the precondition and a new value of the postcondition, wherein the new value of the precondition is dependent upon at least one value from the second set of values, and wherein the new value of the postcondition is dependent upon at least one value from the third set of values.

14. The computer readable storage medium of claim 10, wherein the first set of values indicates a first version of the product configuration, wherein the second set of values indicates a second version of the product configuration, and wherein both the first version and the second version comply with the rules applied by the stateless constraint engine.

15. The computer readable storage medium of claim 10, wherein the precondition and the postcondition are associated with a configuration sequence.

16. The computer readable storage medium of claim 10, wherein the precondition and the postcondition are associated with a prespecified user experience.

17. The computer readable storage medium of claim 10, wherein the stateless constraint engine is configured to enforce a plurality of constraints, and wherein at least one of the constraints is a weak constraint.

18. The computer readable storage medium of claim 10, wherein the program instructions are further executable to:

if the postcondition is true, reevaluate the precondition based at least in part on one or more values among the second set of values.

19. A system comprising:

computer readable storage means for storing a procedural constraint; and procedural validation means for:

accessing a first set of values generated by a stateless constraint engine, wherein the first set of values are generated based upon a first set of inputs to the stateless constraint engine, wherein the first set of inputs indicates a first set of user selections during a product configuration, and a set of one or more rules applied by the stateless constraint engine;

access a second set of values generated by the stateless constraint engine, wherein the second set of values are generated subsequent to generation of the first set of values, the second set of values are generated based upon a second set of inputs to the stateless constraint engine, the second set of inputs indicates a second set of user selections during product configuration, and the second set of user selections is made subsequent to the first set of user selections and subsequent to generation of the first set of values; and validate the second set of values based upon the procedural constraint, at least one value from the first set of values, and at least one value from the second set of values.

* * * * *

UNITED STATES PATENT AND TRADEMARK OFFICE
CERTIFICATE OF CORRECTION

| | | |
|---|---|---|
| PATENT NO. | : 8,160,990 B2 | Page 1 of 1 |
| APPLICATION NO. | : 12/254663 | |
| DATED | : April 17, 2012 | |
| INVENTOR(S) | : Varmaraja et al. | |

It is certified that error appears in the above-identified patent and that said Letters Patent is hereby corrected as shown below:

In column 7, line 30, delete "RI" and insert -- R1 --, therefor.

Signed and Sealed this
Tenth Day of July, 2012

David J. Kappos
*Director of the United States Patent and Trademark Office*